United States Patent [19]

Lhenry

[11] Patent Number: 4,458,670

[45] Date of Patent: Jul. 10, 1984

[54] ORIENTATION MOUNT FOR A SOLAR HEATING MODULE

[75] Inventor: Bernard Lhenry, Le Creusot, France

[73] Assignee: Creusot-Loire, Paris, France

[21] Appl. No.: 265,483

[22] Filed: May 20, 1981

[30] Foreign Application Priority Data

May 30, 1980 [FR] France .................. 80 12033

[51] Int. Cl.³ .......................... F24J 3/02
[52] U.S. Cl. ................... 126/424; 126/438; 126/439; 353/3; 350/289
[58] Field of Search ............. 126/438, 439, 424, 425, 126/451; 353/3; 350/289

[56] References Cited

U.S. PATENT DOCUMENTS

| | | | |
|---|---|---|---|
| 2,712,772 | 7/1955 | Trombe | 126/425 X |
| 3,305,686 | 2/1967 | Carter et al. | 126/425 X |
| 4,178,913 | 12/1979 | Hutchinson | 126/424 |
| 4,249,514 | 2/1981 | Jones | 126/424 X |

*Primary Examiner*—Larry Jones
*Attorney, Agent, or Firm*—Pollock, Vande Sande & Priddy

[57] ABSTRACT

The present invention relates to an elevation orientation mount for a parabolic mirror reflector of a solar heating module. The altazimuthal orientation mount according to the invention is adapted to a solar heating module comprising a parabolic mirror reflector orientable around a horizontal axis by a jack actuating unit whose cylinder is a turret and whose rod is articulated to the reflector. The jack is equipped for return and locking tending to extend the rod and to lock it at the stroke-end where the reflector occupies a position such that its axis of revolution is vertical.

5 Claims, 2 Drawing Figures

ORIENTATION MOUNT FOR A SOLAR HEATING MODULE

FIELD OF THE INVENTION

The present invention relates to an elevation and azimuth orienting mount for the parabolic mirror reflector of a solar heating module concentrating solar energy on a boiler placed at the focus of this reflector.

BACKGROUND OF THE INVENTION

Solar heating modules are known comprising a mirror reflector of parabolic shape designed to concentrate solar energy on to a boiler placed at the focus of this reflector. This reflector, also called a concentrator, is oriented as a unit so as to follow the movements of the sun in its diurnal motion.

It is formed by a parabolic dome constituted by several reflectors or triangular mirrors mounted on a framework. The light rays are concentrated at the focus on a boiler attached to the mobile reflector.

The boiler is of monotubular design, of copper tubing covered with a coating having a high absorption factor. This boiler enables heat exchange fluid to be heated which is removed through a collector. The reflector is mounted on an altazimuthal mount which is preferred to an equatorial mount. The reflector is pivotably mounted, around a horizontal axis, on a turret so as to enable orientation in elevation. This turret pivots, around a vertical axis, on a frame fixed to the ground so as to enable orientation in azimuth westward or eastward. The elevational orientation is actuated by a hydraulic jack the rod of which articulated to the extrados of the reflector and the cylinder of which articulated on the rotary turret. A cable and jack system controls the orientation in azimuth. A module of this type is, for example, described in French Pat. No. 2,403,525. It enables the reduction of losses by reflected radiation and does not require high accuracy of sighting, due to the fact that the boiler follows the movement of the reflector. The orientation mount must orient the parabolic reflector in a "wind resisting" position, the axis of the reflector being vertical when the winds are violent. The known orientation mount of the reflector for this type of module has certain drawbacks. It necessitates in particular a non-negligeable expenditure of energy.

SUMMARY OF THE INVENTION

It is an object of the present invention to provide an elevation and azimuth orienting mount for the reflector of a module as previously described, requiring only a low consumption of energy. In case of accident or of rupture of the hydraulic circuit, the orientation mount automatically assures positioning of the reflector in "wind-resisting" position, of the axis of this vertical reflector. It is a particular object of the invention to provide a hydraulic jack system adapted to such a mount. This orientation mounting possesses high safety of operation. The altazimuthal orientation mount according to the invention is adapted to a solar heating module comprising a parabolic mirror reflector which can be oriented around a horizontal axis by a jack control unit the cylinder of which is articulated to a turret and the rod of which is articulated to the reflector, the jack being equipped with return and locking means tending to extend the rod and to lock it in stroke-end position (rod out) where the reflector occupies a position such that its axis of revolution is vertical.

According to one feature of the invention, the jack includes a fixed partition comprised between on the one hand a piston fast to the rod and separating a chamber on the rod side supplied with oil and a chamber on the partition side containing oil, and a movable piston sliding between said partition and the bottom separating a chamber containing oil on the side of the partition and a chamber containing gas on the bottom side, the two chambers situated on each side of the partition being connected to one another under the control of a pilot valve.

The invention will now be described in more detail with reference to an embodiment given purely by way of example and shown in the accompanying drawings.

DETAILED DESCRIPTION

Figure 1:
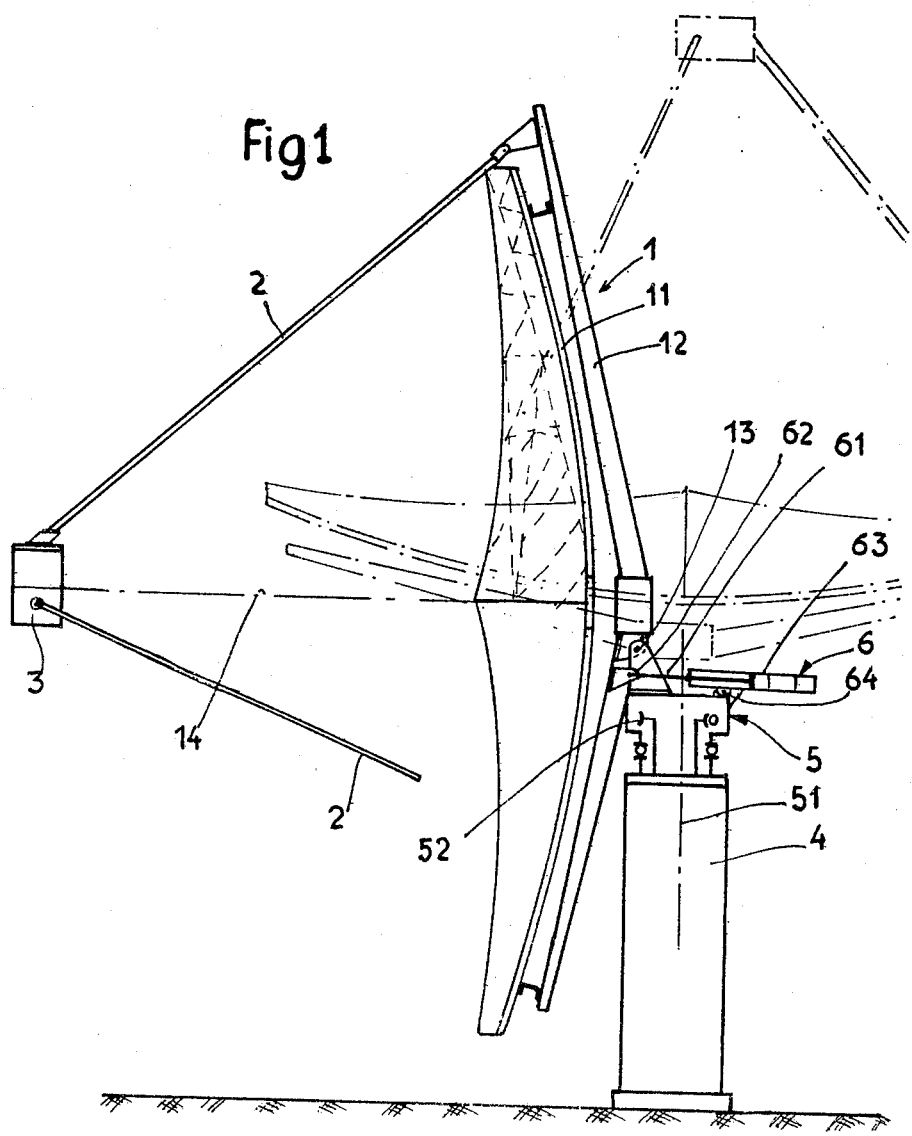
FIG. 1 is a vertical section of a solar heating module equipped with an embodiment of the orientation mount according to the invention.

The solar heating module shown in FIG. 1 comprises a reflector or concentrator 1 formed by a reflecting dome 11 of parabolic shape and a framework 12 serving for the support of this dome on the side of the convex portion. This reflecting dome is constituted by an assembly of triangular and contiguous mirrors which concentrate the light rays to the focus of the parabola. The reflector is made fast, through radiating struts 2, to a boiler 3 mounted at the focus of the parabolic dome. This monotubular boiler is of copper tubing covered with a coating having a high absorption factor. At least one of the radiating struts serves to channel the heat exchanger fluid which flows into the tube of the boiler.

The mirror reflector 1 is supported by a base 4 which is fixed to the ground. This reflector can be oriented in elevation around a horizontal pivoting axle 13 connecting the framework 12 to a turret 5. This turret can pivot around a vertical axis 51 with respect to the base 4.

The turret 5 supports a worm reducing gear the worm screw of which engages a crown wheel 52 which is coaxial with the axis 51 and which is fast to the base 4. This reducing gear is driven by an hydraulic motor.

The orientation in elevation of the parabolic reflector 1, around the pivoting axle 13, is controlled by a jack 6. The rod 61 of this jack is coupled through an articulation or a ball joint 62 to the framework 12 of the reflector. The cylinder 63 of this jack is connected through a cylindrical articulation 64 to the turret 5.

The articulation 62 is offset from the axis of revolution 14 of the parabolic dome and is offset on the other hand from the axis of rotation 51 of the turret. The pivoting axle 13 is situated between the articulation 62 and the axis of revolution 14.

The jack 6 for elevation orientation comprises return and locking means enabling the reflector 1 to be pivoted from a position wherein the axis of this reflector is inclined to the "wind resisting" position in which the axis of revolution 14 is substantially vertical and locking the reflector in this position.

Figure 2:
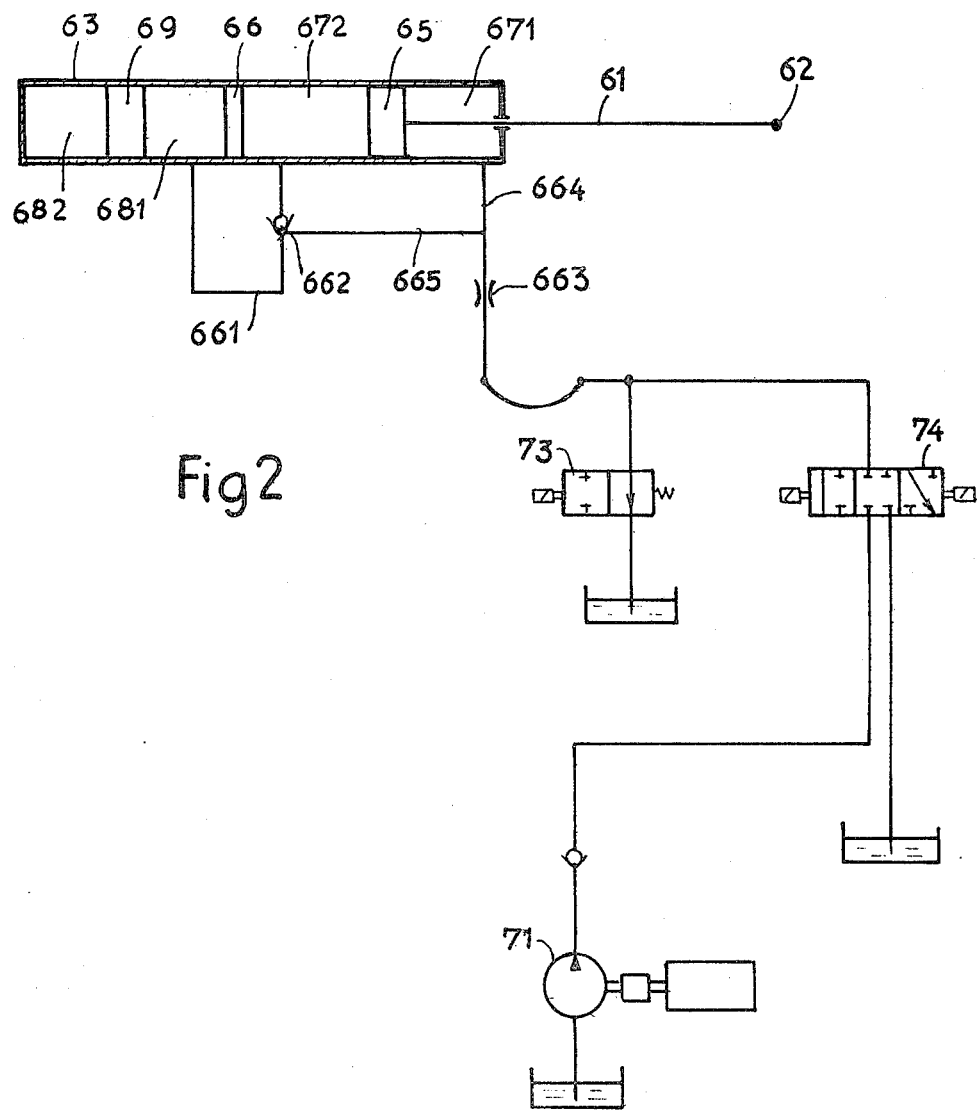
FIG. 2 is a diagram of a hydraulic elevation orientation system.

The jack for elevation orientation which is shown in detail by FIG. 2 comprises a cylinder 63 in which a separating partition 66 is fixedly mounted between the bottom and the passage flange of the rod 61. This partition 66 is positioned between the movable piston 65 fast to the manipulating rod 61 and the movable piston 69. The piston 65 slides between the partition 66 and the passage flange of the rod. The piston 69 slides between the partition and the bottom of the jack. The piston 65 separates a chamber 671 on the rod side, supplied with oil or hydraulic liquid, from a chamber 672 containing oil and bounded by the partition 66. The movable piston 69 separates an oil-containing chamber 681, on the side of the partition 66, from containing a chamber 682 bounded by the bottom and containing a pressurized gas such as nitrogen. The two intermediate chambers 672 and 681 situated on each side of the partition 66 and containing oil or hydraulic liquid are connected by a pipe 661 in which is mounted a pilot check valve 662 which controls the flow of oil between these chambers. The chamber 671 traversed by the rod 61 is supplied with oil by a pipe 664 through a calibrated orifice 663. The valve 662 is controlled through a pipe 665 connected downstream of the orifice 663 to the pipe 664. A pump 71 supplies oil or hydraulic liquid to the chamber 671 and to the pilot valve 662 through the pipe 664. The oil flow rate is controlled by ball electrovalves 73 and 74.

The operation of the elevation orientation mechanism will now be described.

For any intermediate value of the elevation position, the chamber 671 traversed by the rod is under pressure. The force produced by the pressure of nitrogen in the chamber 682 prevails over the force due to the weight of the reflector, which assures overbalancing. Due to the pressure downstream of the orifice 663, the valve 662 is piloted open. The intermediate chambers 681 and 672 are in communication through the pipe 661 and behave like an oil chamber. The pistons 69 and 65 move in synchronism as if they were fast to one another.

When the oil coming from the pump is introduced into the chamber 671, the rod re-enters and the piston 69 compresses the nitrogen. When the oil from the chamber 671 flows to the tank by the opening of the valve 73 or of the valve 74, the nitrogen contained in the chamber 682 pushes back the piston 69 and the piston 65 so as to cause the rod to emerge. At the stroke-end of the pistons (rod 61 extended to the maximum) the hydraulic pressure is cancelled downstream of the orifice 663, notably in the chamber 671, since there is no more movement of fluid through this orifice. The valve 662 is no longer piloted and is opposed to the passage of the oil between the chamber 672 limited by the piston 65 fast to the rod and the chamber 681 limited by the rod-less piston. In this end of stroke position (rod extended), the reflector is in the wind-resisting position (axis of revolution substantially in vertical position) and the jack assures locking to the rod in position. The rod cannot then re-enter and the reflector cannot pivot even in the case where a strong wind acts on this reflector.

It is possible, without departing from the scope of the invention, to conceive modifications and improvements in details and to envisage the use of equivalent means.

What is claimed is:

1. Orientation device for a solar heating module, comprising a parabolic mirror reflector (11) orientatable on a turret (5) about a horizontal pivoting axle (13) by means of a jack having a bottom side and having its cylinder (63) articulated to said reflector and fast to a piston (65) which separates a first chamber (671) supplied with hydraulic liquid by a pipe (664) from a second chamber (672) containing hydraulic liquid and connected to a third chamber (681) containing hydraulic liquid and subjected to a pressurized gas, said jack comprising in said cylinder a fixed partition (66) separating said second and third chambers (672, 681), said piston (65) fast to a rod sliding between said partition and a passage flange of said rod and means (69) located between said partition and said bottom side of said jack so as to separate said third chamber (681) and said pressurized gas, the flow of hydraulic liquid between said second and third chambers being controlled by a pilot check valve (662) piloted by hydraulic liquid from said pipe (664).

2. Orientation device according to claim 1, wherein said means (69) for separating said third chamber and said pressurized gas comprises a piston sliding in said cylinder.

3. Orientation device according to claim 1, wherein said second and third chambers (672, 681) are located on opposite sides of said fixed partition (66), said first chamber (671) being traversed by said rod and the chamber (682) containing said pressurized gas being located on the bottom side.

4. Orientation device according to claim 1, wherein said first chamber (671) is supplied through a calibrated orifice (663).

5. Orientation device according to claim 1, wherein the horizontal axle (13) of said reflector (11) on said turret (5) is offset both from the axis of rotation of said turret and from the axis of revolution of said reflector.

* * * * *